(12) United States Patent
Jean et al.

(10) Patent No.: US 6,228,788 B1
(45) Date of Patent: May 8, 2001

(54) HIGH-FREQUENCY CERAMIC INDUCTOR FORMULATION

(75) Inventors: Jau-Ho Jean; Shih-Chun Lin, both of Taipei (TW)

(73) Assignee: Advanced Ceramic X Corporation (TW)

( * ) Notice: Subject to any disclaimer, the term of this patent is extended or adjusted under 35 U.S.C. 154(b) by 0 days.

(21) Appl. No.: 09/450,435

(22) Filed: Nov. 30, 1999

Related U.S. Application Data

(63) Continuation-in-part of application No. 09/137,811, filed on Aug. 21, 1998, now abandoned.

(51) Int. Cl.$^7$ .................................................. C03C 14/00
(52) U.S. Cl. .............................................. 501/32; 501/66
(58) Field of Search ........................................ 501/32, 66

(56) References Cited

U.S. PATENT DOCUMENTS

| | | | |
|---|---|---|---|
| 4,849,379 | * | 7/1989 | McCormick ........................... 501/32 |
| 4,849,380 | * | 7/1989 | Sawhhill ............................... 501/32 |
| 5,206,190 | * | 4/1993 | Jean et al. ............................. 501/32 |
| 5,212,121 | * | 5/1993 | Omata et al. ......................... 501/32 |
| 5,242,867 | * | 9/1993 | Lin et al. ............................... 501/32 |
| 5,342,674 | * | 8/1994 | Tanei et al. ............................ 501/32 |
| 5,747,396 | * | 5/1998 | Miyakoshi et al. ................... 501/32 |
| 5,902,758 | * | 5/1999 | Hazeyanja et al. .................... 501/32 |

* cited by examiner

*Primary Examiner*—Karl Group
(74) *Attorney, Agent, or Firm*—Michael D. Bednarek; Shaw Pittman

(57) ABSTRACT

Disclosed are ceramic compositions for high-frequency ceramic inductors. The ceramic compositions comprise a mixture of finely divided particles consisting of 20–80% by weight of borosilicate glass and 80–20% by weight of an oxide filler, which can be densified up to 95% at temperatures between 800–1000° C. The ceramic compositions can be processed with organic solvent, polymeric binder and plasticizer to produce green sheets that are co-firable with highly conductive metal such as gold, silver, silver-palladium and copper.

4 Claims, No Drawings

HIGH-FREQUENCY CERAMIC INDUCTOR FORMULATION

This is a continuation-in-part of Ser. No. 09/137,811, filed Aug. 21, 1998, now abandoned.

BACKGROUND OF THE INVENTION

1. Field of the Invention

The present invention relates in general to ceramic compositions. In particular, the present invention is directed to ceramic compositions for producing multilayer ceramic inductors. The ceramic compositions disclosed herein can be sintered at relatively low temperatures to produce low-dielectric dense bodies.

2. Description of the Related Arts

One of major trends in electronic packaging industry is to use surface mount technology (SMT) as a replacement for conventional plated through-hole (PTH) technology. SMT offers several distinct advantages including greater packaging density, higher lead counts with shorter interconnection lengths and easier automation over PTH technology. Since SMT demands electronic devices and components to be mountable on the surface of a printing wiring board, the materials and structure of traditional leaded components including capacitors, resistors and inductors have to be redesigned to meet the requirements of short, thin, light and small electronic devices era. In the past 30-year development of surface mountable passive components, inductor is the least successful one, because it has wire to wind and is difficult to be miniature without degradation of magnetic properties. Magnetic shielding is also important, especially for high packaging density; therefore, the inductor has to be boxed to prevent magnetic flux leakage and cross talks between inductors. To fulfill the above requirements, the multilayer chip inductor (MLCI) is thus developed.

Two major technologies including dry and wet processes have been developed to fabricate MLCI. In the dry process, thin and flat ceramic green tapes are first made by tape casting, and then each green tape is via punched and screen printed with metal paste. The thus made green tapes are stacked, laminated and cofired to obtain the final monolithic MLCI parts. Except via punching step, the dry process is similar to that used in manufacturing multilayer ceramic capacitors (MLCC). For the wet process, the tape casting is used to prepare the first ceramic layer on which the multilayer internal winding structure is fabricated by screen printing. Metal paste is screen printed by a half turn winding on the ceramic green tape and then the ceramic paste is screen printed to cover the metal layer except the connection part of winding. The above alternating processes continue until the required number of winding layers is achieved. The multilayer structure is then covered and laminated with a ceramic green tape, and finally cofired to obtain MLCI parts. Metal as well as ceramic pastes are needed in this process.

For high-frequency MLCI applications, a low-dielectric-constant, low-temperature cofirable ceramics (LTCC) metallized with high-electrical-conductivity metals such as Ag has been developed. Most of these LTCC tape systems have dielectric constants between 5 and 10 and encompass a range of low dielectric loss between 0.01–0.5% at frequency greater than 300 MHz. This invention is to disclose a low temperature co-firable MLCI system using a glass plus ceramic approach that can be densified at 800–1000° C. for 15–60 min. The densified LTCC system has a dielectric constant below 8.0 and a dielectric loss of 0.1–0.2% at 1 MHz.

There have been numerous attempts to make a low temperature co-firable MLCI substrate. A ferrite composition comprising ferrite, borosilicate glass, and optionally boron is described in U.S. Pat. No. 4,956,114. The ferrite composition can be fired at a relatively low temperature of 950° C. into a sintered body having improved mechanical strength and electromagnetic properties. The sintered ferrite body is used to form a chip inductor.

U.S. Patent No. 4,540,500 discloses a magnetic ferrite material that can be sintered at a low temperature by adding a $Li_2O$—$B_2O_3$—$SiO_2$ glass into the mother ferrite material.

A method for producing multilayer ceramic circuit boards for use with copper conductors is described in U.S. Pat. No. 4,642,148. It discloses a ceramic composition comprising 10–75% by weight of alpha-alumina, 5–70% by weight of non-crystalline quarts (fused silica), and 20–60% by weight of borosilicate glass. The sintered ceramic composition has a dielectric constant ranging from 4.8 to 9.6.

U.S. Pat. No. 4,672,152, issued to Shinohara et al., describes a multilayer ceramic circuit board in which a ceramic insulating layer is prepared from a mixture of 50–95% by weight of crystallized glass and 5–50% by weight of a ceramic filler. The crystallized glass consists of 5–20% by weight of lithium oxide, 60–90% by weight of silicon dioxide, 1–10% by weight of aluminum oxide, and 1–5% by weight of alkal metal oxide other than lithium oxide. The ceramic filler is selected from the group consisting of silicon dioxide, β-eucryptite ($LiAlSiO_4$), and aluminum oxide.

U.S. Pat. No. 3,926,648, issued to Miller et al., discloses a sintered glass-ceramic body containing hexagonal cordierite as the crystalline phase. The glass composition exhibits a dielectric constant of 5.2 and a coefficient of thermal expansion between $1–2\times10^{-6}$ $K^{-1}$.

U.S. Pat. No. 4,755,490, issued to DiLazzaro, describes a low firing temperature ceramic material having a dielectric constant between 4.5 and 6.1 and a coefficient of thermal expansion between $3.9–4.2\times10^{-6}$ $K^{-1}$. The ceramic material is provided from a mixture of 10–50% by weight of alumina, 0–30% by weight of fused silica, and 50–60% by weight of a frit composed of 4% by weight of CaO, 12% by weight of MgO, 29% by weight of $B_2O_3$, and 42% by weight of $SiO_2$. The mixture has a minimum sintering temperature in the range of 850–1000° C.

U.S. Pat. No. 4,788,046, issued to Barringer et al., discloses glass-ceramic packages for integrated circuits by co-sintering a glass-ceramic composite and Cu, Ag, Pd, or Au at a low sintering temperature. The glass-ceramic composite is provided by coating glassy compounds onto ceramic particles. The composite has a low dielectric constant of 4.5 and a thermal expansion coefficient greater than $5.5\times10^{-6}$ $K^{-1}$.

U.S. Pat. No. 4,879,261, issued to Burn, discloses a low dielectric composition for making a ceramic dielectric body having a dielectric constant less than 5.0. The composition is a mixture of finely divided particles consisting essentially of 70–85% by weight of silica and 15–30% by weight of zinc borate flux. The composition can be used to make green tape and multilayer devices having internal copper conductors such as multilayer capacitors and multilayer interconnects.

SUMMARY OF THE INVENTION

It is therefore an object of the invention to provide a low-fire ceramic composition that can be densified up to 95% at temperatures between 800–1000° C. within 60 minutes.

The invention also aims to provide a process for manufacturing high-frequency ceramic articles by using the above ceramic composition. The ceramic articles produced thereby are characterized by a high quality factor and a dielectric constant below 8.0.

According to an aspect of the invention, there is provided a ceramic composition consisting of 20–80% by weight of borosilicate glass and 80–20% by weight of an oxide filler. Preferably, the ceramic composition consists of 40–80% by weight of borosilicate glass and 60–20% by weight of a filler of $Al_2O_3$.

The borosilicate glass used in the invention is regarded as glass phase, which has a softening temperature between 800 and 850° C. The term "glass" is used herein to describe ceramic compositions that melt and form glassy phase at a temperature below 1000° C. The borosilicate glass suitable for use in the invention consists of, as the major components, 10–14 wt % of $B_2O_3$ and 90–80 wt % of $SiO_2$; and as the minor components, 0.1–4 wt % of $Al_2O_3$ and 0.1–4 wt % of alkali metal oxides such as $K_2O$, $Na_2O$, $Li_2O$, or a mixture thereof.

The oxide used in the invention is regarded as ceramic phase. The term "ceramic" is used herein to describe inorganic compositions that will soften only at a temperature exceeding 1000° C. The oxide used herein can be either crystalline or amorphous, and is preferably $Al_2O_3$. Oxides suitable for use in the invention also include $SiO_2$, anortite, mullite, cordierite, and forsterite.

According to another aspect of the invention, there is provided a process for manufacturing ceramic articles characterized by using the above described ceramic compositions. The process comprises the steps of: (a) providing a powder mixture consisting essentially of finely divided particles consisting of 20–80% by weight of borosilicate glass and 80–20% by weight of an oxide filler; and (b) sintering the mixture at a temperature of 800–1000° C. in air. The term "finely divided" is used herein to describe materials that are ground to less than 5 microns in size. The ceramic article produced thereby exhibits a dielectric constant below 8.0.

The ceramic composition of the invention can be fabricated into high-frequency multilayer ceramic inductors as follows: (a) preparing a slurry of (i) 70–85% by weight of a ceramic composition composed of 20–80% by weight of borosilicate glass and 80–20% by weight of an oxide filler, and (ii) 30–15% by weight of organic carriers including an organic binder; (b) casting the slurry to form a green sheet; (c) printing conductive pastes onto the green sheet; (d) laminating together a plurality of printed green sheets to form a multilayer ceramic green compact; (e) subjecting the multilayer ceramic green compact to binder burnout; and (f) sintering the substantially binder free multilayer ceramic green compact in air.

Without intending to limit it in any manner, the present invention will be further illustrated by the following examples. In each example, the borosilicate glass is composed of 13 wt % $B_2O_3$, 80 wt % $SiO_2$, 4 wt % $Na_2O$, and 3 wt % $Al_2O_3$.

EXAMPLE 1

625 g of borosilicate glass powder was wet milled in 775 c.c. of 2-propyl alcohol by a 5-liter ball mill with 5,000 g of alumina balls. The resulting slurry was sieved with a sieve of 325 mesh and dried over an oven at 80° C. for 16 hours. The dried lumps were crushed and ground with pestle and mortar to a particle size ($D_{50}$) of about 1–3 $\mu$m. X-ray diffraction analysis indicated the produced powder was amorphous.

Green compacts of sample Nos. 1A–1I were prepared as follows. A powder mixture was prepared by mixing a finely divided powder consisting of 27 wt % of borosilicate glass and 73 wt % of aluminum oxide. The aluminum oxide particles were about 0.6–5.0 $\mu$m in size ($D_{50}$). The powder mixture was blended with 5 wt % of polyethylene glycol binder and 50 wt % of 1-propyl alcohol through a 3-dimension mixer for 2 hours. The resulting slurry was dried and sieved into dry powders, which were then dry pressed at 13,000 psi into green compacts of 0.3 cm in height and 1.3 cm in diameter.

Subsequently, green compacts 1A–1C, 1D–1F, and 1G–1I were sintered in air at temperatures of 825° C., 850° C., and 875° C., respectively. The green compacts were heated to 500° C. with a heating rate of 5° C./min and maintained at the temperature for one hour to remove the binder completely. The samples were then fired at a heating rate of 5° C./min up to the sintering temperatures, and the soaking periods were in the range of 15–60 minutes. The sintering conditions are tabulated in Table 1.

Relative sintered densities of the densified samples were measured by the water displacement method and the results are shown in Table 1. The relative densities of all tested specimens were below 95%. Such results were also confirmed by examining the fracture surface of the sintered bodies using scanning electron microscopy. As a result of x-ray diffraction analysis of the sintered bodies, only the crystalline phase of $Al_2O_3$ was detected.

EXAMPLE 2

Green compacts of sample Nos. 2A–2I, containing 36 wt % of borosilicate glass and 64 wt % of aluminum oxide, were prepared by the same procedures as in Example 1. The green compacts were subjected to the same procedures of binder burnout and sintering as the green compacts 1A–1I in Example 1. The relative densities of the sintered bodies as well as the sintering conditions are listed in Table 1. It is found that the relative densities of all tested specimens were below 95%. The same results were confirmed by scanning electron microscopy. As a result of x-ray diffraction analysis of the sintered bodies, only the crystalline phase of $Al_2O_3$ was detected.

EXAMPLE 3

Green compacts of sample Nos. 3A–3L, each containing 45 wt % of borosilicate glass and 55 wt % of aluminum oxide, were prepared by the same procedures as in Example 1. Then the green compacts were subjected to the same procedures of binder burnout and sintering. The sintering temperatures of green compacts 3A–3C, 3D–3F, 3G–3I, and 3J–3L were 800°, 825°, 850°, and 875° C., respectively. The relative densities and dielectric properties of the sintered bodies as well as the sintering conditions are listed in Table 1. All of the test specimens reached a relative density of above 95%. Such high densities were confirmed by further examining the fracture surface of the sintered bodies using scanning electron microscopy. As a result of x-ray diffraction analysis of the sintered bodies, only the crystalline phase of $Al_2O_3$ was detected. The sintered bodies thus obtained exhibited dielectric constants ranging from 5.8 to 6.1 and dielectric losses ranging from 0.15% to 0.20%, both at 1 MHz.

TABLE 1

| Sample No. | Sintering temperature (° C.) | Sintering time (min) | Relative sintered density (%) | dielectric constant (@ 1 MHz) | dielectric loss (%) (@ 1 MHz) |
|---|---|---|---|---|---|
| 1A | 825 | 15 | 67.65 | — | — |
| 1B | 825 | 30 | 67.70 | — | — |
| 1C | 825 | 60 | 67.86 | — | — |
| 1D | 850 | 15 | 67.73 | — | — |
| 1E | 850 | 30 | 68.16 | — | — |
| 1F | 850 | 60 | 68.57 | — | — |
| 1G | 875 | 15 | 68.49 | — | — |
| 1H | 875 | 30 | 68.81 | — | — |
| 1I | 875 | 60 | 68.97 | — | — |
| 2A | 825 | 15 | 82.29 | — | — |
| 2B | 825 | 30 | 83.40 | — | — |
| 2C | 825 | 60 | 84.26 | — | — |
| 2D | 850 | 15 | 84.27 | — | — |
| 2E | 850 | 30 | 85.06 | — | — |
| 2F | 850 | 60 | 85.65 | — | — |
| 2G | 875 | 15 | 85.63 | — | — |
| 2H | 875 | 30 | 85.86 | — | — |
| 2I | 875 | 60 | 86.60 | — | — |
| 3A | 800 | 15 | 96.89 | 5.82 | 0.199 |
| 3B | 800 | 30 | 97.08 | 5.92 | 0.170 |
| 3C | 800 | 60 | 97.87 | 6.01 | 0.194 |
| 3D | 825 | 15 | 97.90 | — | — |
| 3E | 825 | 30 | 98.23 | — | — |
| 3F | 825 | 60 | 98.24 | 6.03 | 0.170 |
| 3G | 850 | 15 | 98.67 | — | — |
| 3H | 850 | 30 | 99.05 | — | — |
| 3I | 850 | 60 | 98.46 | 6.13 | 0.162 |
| 3J | 875 | 15 | 98.83 | — | — |
| 3K | 875 | 30 | 98.85 | — | — |
| 3L | 875 | 60 | 98.44 | 6.09 | 0.183 |

Other Embodiments

The low-firing feature of the above ceramic compositions, particularly those of Example 3 (800–875° C.), enables them to be co-fired with low-melting-point wiring conductor such as gold or silver to produce multilayer ceramic inductors.

The ceramic compositions of Example 3 can be co-fired with high electrical conductivity metallurgy such as silver to produce multilayer ceramic inductors as follows. A slurry is prepared by incorporating 70–85 wt % of the ceramic composition and 30–15 wt % of organic carriers including organic solvents such as toluene and ethanol, organic binders such as polyvinyl butyral (PVB), and organic plasticizers such as dibutyl phthalate (DBP). The slurry is cast into thin green sheets having a thickness of about 125 μm using doctor blade. The green sheets are blanked into square sheets of 100×100 mm, and via holes are formed therein by die punching. The via holes preferably have a diameter of about 125 μm. A conductive paste such as Ag or Au paste is applied to the punched sheets in a desired pattern using a screen printing process. The paste is also applied within the via holes so as to form interconnects between conductor patterns. The printed green sheets are stacked in registry and laminated together at 60–100° C. under a pressure of 1000–3000 psi. The laminated green sheets are finally fired at a temperature of 800–900° C. to produce a ceramic multilayer inductor. The ceramic multilayer inductors produced thereby have inductance of about 4.56 nH at 100 MHz, and Q value of about 20 at 100 MHz and about 53 at 800 MHz.

The ceramic compositions of the invention also can be used to make rigid, nonporous ceramic bodies by substantially conventional techniques. For example, the ingredients of any of the previous examples can be blended with water and organic binders and ball milled to form a slurry. The slurry is spray dried to give a powder of substantially spherical particles. This powder can be compressed into bodies of desired shapes by dry pressing or isostatic pressing, followed by sintering at temperatures not exceeding 1000° C. to produce high-frequency ceramic articles.

What is claimed is:

1. A ceramic composition for producing high-frequency ceramic inductors, which can be densified up to 95% at temperatures between 800–1000° C. within 60 minutes, said composition consisting of: (a) 20–80% by weight of a borosilicate glass comprising 10–14% by weight of $B_2O_3$, 90–80% by weight of $SiO_2$, 0.1–4% by weight of $Al_2O_3$ and 0.1–4% by weight of alkali metal oxides; and (b) 80–20% by weight of a filler of $Al_2O_3$.

2. The ceramic composition as claimed in claim 1, which consists of: (1) 40–80% by weight of said borosilicate glass; and 60–20% by weight of a filler of $Al_2O_3$.

3. The ceramic composition as claimed in claim 1, wherein said alkali metal oxide is selected from the group consisting of: $K_2O$, $Na_2O$, $Li_2O$, and mixtures thereof.

4. The ceramic composition as claimed in claim 1, wherein said borosilicate glass has a softening point between 800 and 850° C.

* * * * *